(12) United States Patent
Takenaka

(10) Patent No.: US 12,511,189 B2
(45) Date of Patent: Dec. 30, 2025

(54) NON-VOLATILE MEMORY DEVICE

(71) Applicant: ROHM CO., LTD., Kyoto (JP)

(72) Inventor: Seiji Takenaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 18/507,945

(22) Filed: Nov. 13, 2023

(65) Prior Publication Data
US 2024/0086275 A1  Mar. 14, 2024

Related U.S. Application Data

(63) Continuation of application No. PCT/JP2022/018521, filed on Apr. 22, 2022.

(30) Foreign Application Priority Data

May 14, 2021 (JP) ................................ 2021-082616

(51) Int. Cl.
G06F 11/10 (2006.01)
(52) U.S. Cl.
CPC .................................. G06F 11/10 (2013.01)
(58) Field of Classification Search
CPC . G06F 11/10; G06F 11/16; G11C 7/14; G11C 16/04; G11C 16/28; G11C 29/00; G11C 16/30; G11C 11/1673; G11C 13/0002; G11C 13/004; G11C 2013/0054; G11C 16/26
USPC .......... 714/763; 326/38, 27, 113, 41, 81, 83; 365/189.09, 210.1, 210.14
See application file for complete search history.

(56) References Cited

U.S. PATENT DOCUMENTS

| | | | | |
|---|---|---|---|---|
| 5,197,028 A | * | 3/1993 | Nakai | G11C 16/28 365/194 |
| 6,678,860 B1 | * | 1/2004 | Lee | H03M 13/13 714/763 |
| 6,791,890 B2 | * | 9/2004 | Ooishi | G11C 29/02 365/201 |
| 2006/0034142 A1 | * | 2/2006 | Ooishi | G11C 8/10 365/230.06 |
| 2008/0094898 A1 | * | 4/2008 | Nakano | G11C 7/1006 365/189.12 |

(Continued)

FOREIGN PATENT DOCUMENTS

| | | |
|---|---|---|
| JP | 2009-277294 | 11/2009 |
| JP | 2010-250866 | 11/2010 |

(Continued)

OTHER PUBLICATIONS

International Search Report and Written Opinion in International Appln. No. PCT/JP2022/018521, mailed on Jul. 19, 2022, 14 pages (with machine translation).

*Primary Examiner* — Albert Decady
*Assistant Examiner* — Grace V Braden
(74) *Attorney, Agent, or Firm* — Fish & Richardson P.C.

(57) ABSTRACT

A non-volatile memory device (100) comprises a memory cell (11A, 11B) that is, in an initial state, in a state of having storage data of a first logical value stored therein, and that is, after execution of a program operation, in a state of having storage data of a second logical value stored therein, and an error correction circuit (14) that corrects only an error caused by a change in logical value of the storage data stored in the memory cell from the second logical value to the first logical value.

7 Claims, 13 Drawing Sheets

(56) References Cited

U.S. PATENT DOCUMENTS

| | | | | |
|---|---|---|---|---|
| 2009/0183052 A1* | 7/2009 | Kanno | ............... | G11C 29/52 |
| | | | | 714/763 |
| 2009/0285033 A1* | 11/2009 | Yamada | ............ | G11C 17/18 |
| | | | | 365/225.7 |
| 2010/0124125 A1* | 5/2010 | Amanai | ............ | G11C 16/28 |
| | | | | 365/185.21 |
| 2017/0123904 A1* | 5/2017 | Park | ............... | G06F 11/1068 |

FOREIGN PATENT DOCUMENTS

| JP | 2011-103158 | 5/2011 |
|---|---|---|
| JP | 2011-210316 | 10/2011 |

\* cited by examiner

Data "0"

Data "0"

Data "1"

Data "1"

NON-VOLATILE MEMORY DEVICE

CROSS-REFERENCE TO RELATED APPLICATIONS

This nonprovisional application is a continuation application of International Patent Application No. PCT/JP2022/018521 filed on Apr. 22, 2022, which claims priority Japanese Patent Application No. 2021-082616 filed on May 14, 2021, the entire contents of which are hereby incorporated by reference.

TECHNICAL FIELD

The present disclosure relates to a non-volatile memory device.

BACKGROUND ART

A conventional non-volatile memory device uses hot carrier injection into a transistor. A non-volatile memory device of this type includes first and second transistors having the same characteristics in their initial states as memory elements, and performs hot carrier injection only with respect to one of the first and second transistors to change the characteristics of the transistor. In a subsequent read operation, based on a magnitude relationship between drain currents of the first and second transistors when a common gate voltage is supplied to the first and second transistors, it is read out whether data of "0" is stored or data of "1" is stored. For example, a state where the drain current of the first transistor is smaller (a state where the characteristics of the first transistor have changed) corresponds to a state where the data of "0" is stored, whereas a state where the drain current of the second transistor is smaller (a state where the characteristics of the second transistor have changed) corresponds to a state where the data of "1" is stored.

However, in the above non-volatile memory device, storage data (a logical value) in the initial state is indeterminate. Such indeterminate storage data disadvantageously prevents execution of defective product testing at the shipping stage. To address this disadvantage, there has been proposed a non-volatile memory device configured such that, to prevent indeterminate storage data in the initial state, of first and second transistors, the second transistor has a larger drain current flowing therein in the initial state. In a non-volatile memory device of this type, the storage data can be fixed to "0" in the initial state, and the storage data can be turned to "1" through hot carrier injection with respect to the second transistor.

As to technologies related to the above, for example, Patent Document 1 identified below discloses one.

CITATION LIST

Patent Literature

[Patent Document 1] Japanese Unexamined Patent Application Publication No. 2011-103158

DESCRIPTION OF EMBODIMENTS

Hereinafter, exemplary embodiments will be described with reference to the accompanying drawings. A non-volatile memory device described below may be constituted as a semiconductor integrated circuit.

1. Storage Circuit

Figure 1:
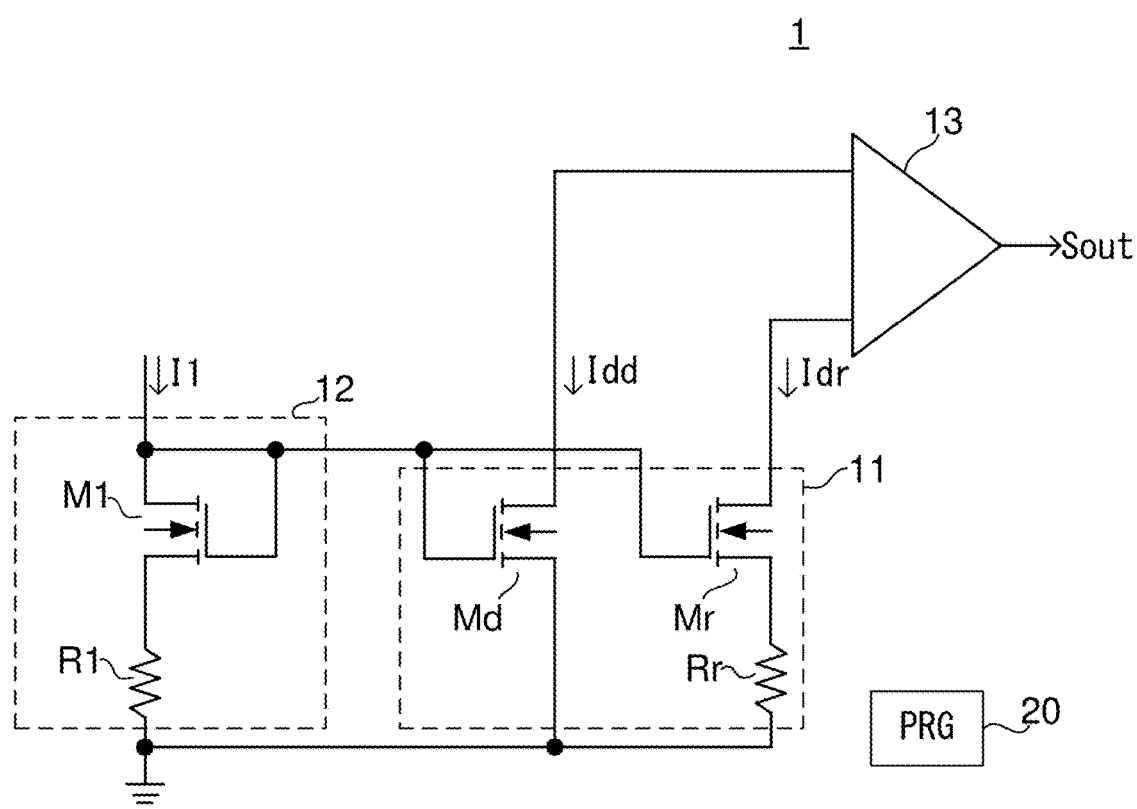
FIG. 1 is a diagram showing a configuration of a storage circuit according to an embodiment of the present disclosure.

Here, a storage circuit will be described which is a basic component of a non-volatile memory device according to the present disclosure. FIG. 1 is a diagram showing a configuration of a storage circuit 1 according to an embodiment of the present disclosure. The storage circuit 1 is a circuit that stores one-bit data, and includes a memory cell 11, a gate voltage generation portion 12, and a sense amplifier 13. FIG. 1 further shows a program circuit 20, which will be described later.

The memory cell 11 includes a data element Md, a reference element Mr, and a reference resistor Rr. The memory cell 11 stores data of "0" or data of "1".

The data element Md and the reference element Mr are memory elements each configured as a transistor, and are each composed of an NMOS transistor (N-channel MOSFET (Metal-Oxide-Semiconductor Field Effect Transistor)).

The gate voltage generation portion 12 includes an NMOS transistor M1 and a resistor R1. A gate and a drain of the NMOS transistor M1 are short-circuited. A source of the NMOS transistor M1 is connected to one end of the resistor R1. The other end of the resistor R1 is connected to a ground end (a ground potential application end to which a ground potential is applied).

A gate of the data element Md and a gate of the reference element Mr are commonly connected to the gate of the NMOS transistor M1. A source of the data element Md is connected to the ground end. A source of the reference element Mr is connected to one end of the reference resistor Rr. The other end of the reference resistor Rr is connected to the ground end. A drain of the data element Md is connected to one of input ends of the sense amplifier 13. A drain of the reference element Mr is connected to the other one of the input ends of the sense amplifier 13.

The resistor R1 and the reference resistor Rr are equal in resistance value. The NMOS transistor M1 and the reference element Mr have the same configuration as each other. As a result, due to a current mirror composed of the NMOS transistor M1 on an input side and the reference element Mr on an output side, between a drain current I1 flowing in the NMOS transistor M1 and a drain current Idr flowing in the reference element Mr, I1:Idr=1:1 holds. Gate voltages are generated according to the drain current I1 to be respectively applied to the gates of the data element Md and the reference element Mr. Or, the reference element Mr may be n times (n>1) the size of the NMOS transistor M1. In that case, I1:Idr=1:n holds.

The data element Md and the reference element Mr have the same structure as each other, and have the same electrical characteristics as each other before execution of a program operation by the program circuit 20. The program operation performed by the program circuit 20 is targeted at the data element Md. Thus, before execution of the program operation, the data element Md and the reference element Mr have the same gate threshold voltage as each other. As a result, before execution of the program operation, a drain current Idd flowing in the data element Md and the drain current Idr flowing in the reference element Mr connected to the reference resistor Rr have a magnitude relationship of Idd>Idr. In this manner, by providing the reference resistor Rr, it is possible to generate a magnitude difference between the drain currents Idd and Idr before execution of the program operation (that is, in an initial state of the memory cell 11).

Here, regarding a transistor, structure is a concept including size of the transistor, and thus, if any plural number of transistors are structurally the same as each other, it means that the plural number of transistors are the same as each other in size as well. When structures of a given plural number of transistors are the same as each other, if hot carrier injection by means of the program operation is not performed with respect to the plural number of transistors, the electrical characteristics (including the gate threshold voltages and the like) of the plural number of transistors are also the same as each other. However, it should be noted that if the structures and the electrical characteristics of any plural number of transistors are the same, it means that they are designed to be the same, and thus they can in practice contain some tolerance (in other words, "the same" is understood as a concept that includes some tolerance).

In the storage circuit 1, a read operation for reading out data stored in the memory cell 11 and the program operation (a write operation) for rewriting data (a logical value) stored in the memory cell 11.

Figure 2:
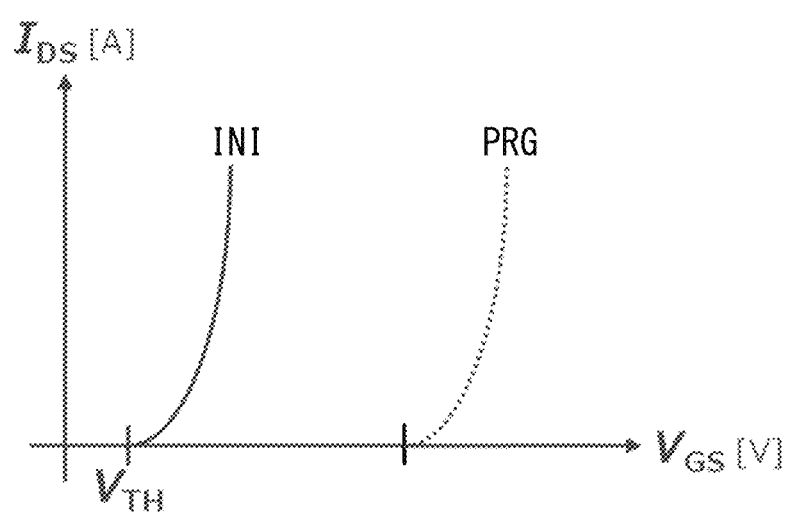
FIG. 2 is a diagram showing an example of a relationship between a drain current and a gate-source voltage in a data element.

The program operation is achieved by the program circuit 20. In the program operation, the program circuit 20 injects hot carriers into the data element Md, and thereby changes the electrical characteristics of the data element Md. As a result of this change, the gate threshold voltage rises. Here, in FIG. 2, a solid-line wave INI indicates dependence of the drain current of the data element Md on a gate-source voltage before execution of the program operation (that is, in the initial state of the memory cell 11), and a dotted-line wave PRG indicates dependence of the drain current of the data element Md on the gate-source voltage after execution of the program operation. Thus, by the program operation, the gate threshold voltage Vth is caused to rise.

The program operation is executed, for example, by applying a power supply voltage VDD (see FIG. 3 referred to later), the power supply voltage VDD, and a ground potential (0 V) respectively to the gate, the source, and the drain of the data element Md.

In a state (a read current supply state) where the current I1 (a read current) is supplied, the sense amplifier 13, in the read operation, outputs an output signal Sout corresponding to a value (a logical value) of data stored in the memory cell 11 based on the magnitude relationship between the respective drain currents Idd and Idr of the data element Md and the reference element Mr. A state where the drain current Idd is larger than the drain current Idr corresponds to a state where data of "0" is stored in the memory cell 11. Before execution of the program operation (in the initial state of the memory cell 11), Idd>Idr holds, and thus, in the read operation, the sense amplifier 13 outputs the output signal Sout (e.g., low-level output signal Sout) that corresponds to the data of "0".

By execution of the program operation in which hot carriers are injected into the data element Md, the gate threshold voltage of the data element Md is caused to rise. As a result, after the execution of the program operation, the gate threshold value of the data element Md becomes higher than that of the reference element Mr. Consequently, in the read current supply state after the execution of the program operation, the magnitude relationship between the drain currents Idd and Idr becomes Idd<Idr. A state where the drain current Idd is smaller than the drain current Idr corresponds to a state where data of "1" is stored in the memory cell 11. Accordingly, in the read operation, when the drain current Idd is smaller than the drain current Idr, the sense amplifier 13 outputs the output signal Sout (e.g., high-level output signal Sout) that corresponds to the data of "1".

Thus, in the storage circuit 1, before execution of the program operation (in the initial state of the memory cell 11), data of "0" is stored in the memory cell 11, and data of "1" can be stored in the memory cell 11 by executing the program operation. That is, it is possible to avoid indetermination of the value of data stored in the memory cell 11 in the initial state.

2. Sense Amplifier

Figure 3:
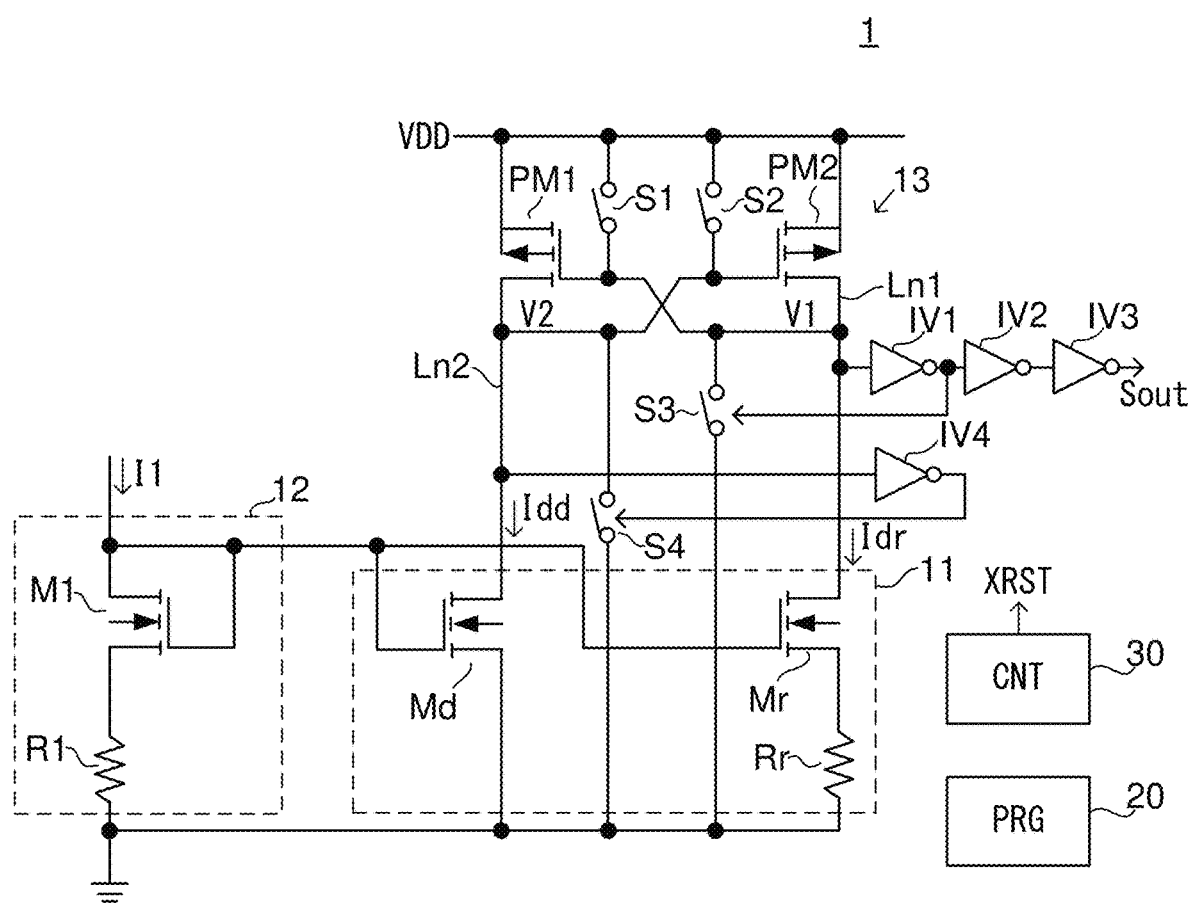
FIG. 3 is a diagram showing a configuration of a storage circuit including a specific configuration example of a sense amplifier.

Here, FIG. 3 is a diagram showing a configuration of the storage circuit 1 including a specific configuration example of the sense amplifier 13. As shown in FIG. 3, the sense amplifier 13 includes PMOS transistors PM1 and PM2, switches S1 and S2, switches S3 and S4, and inverters IV1 to IV4.

A source of the PMOS transistor (P-channel MOSFET) PM2 is connected to a power supply voltage VDD application end to which the power supply voltage VDD is applied. A drain of the PMOS transistor PM2 is connected to a line Ln1. A gate of the PMOS transistor PM2 is connected to a line Ln2.

A source of the PMOS transistor PM1 is connected to the power supply voltage VDD application end. A drain of the PMOS transistor PM1 is connected to the line Ln2. A gate of the PMOS transistor PM1 is connected to the line Ln1.

Between the power supply voltage VDD application end and the line Ln1, the switch S1 is connected. Between the power supply voltage VDD application end and the line Ln2, the switch S2 is connected.

An input end of the inverter IV1 is connected to the line Ln1. An output end of the inverter IV1 is connected to an input end of the inverter IV2. An output end of the inverter IV2 is connected to an input end of the inverter IV3. From the inverter IV3, the output signal Sout is output.

Between the line Ln1 and the ground end, the switch S3 is connected. According to an output of the inverter IV1, on/off of the switch S3 is controlled. Between the line Ln2 and the ground end, the switch S4 is connected. An input end of the inverter IV4 is connected to the line Ln2. According to an output of the inverter IV4, on/off of the switch S4 is controlled.

A control circuit 30 is capable of outputting a signal XRST, and controls on/off of the switches S1 and S2.

Figure 4:
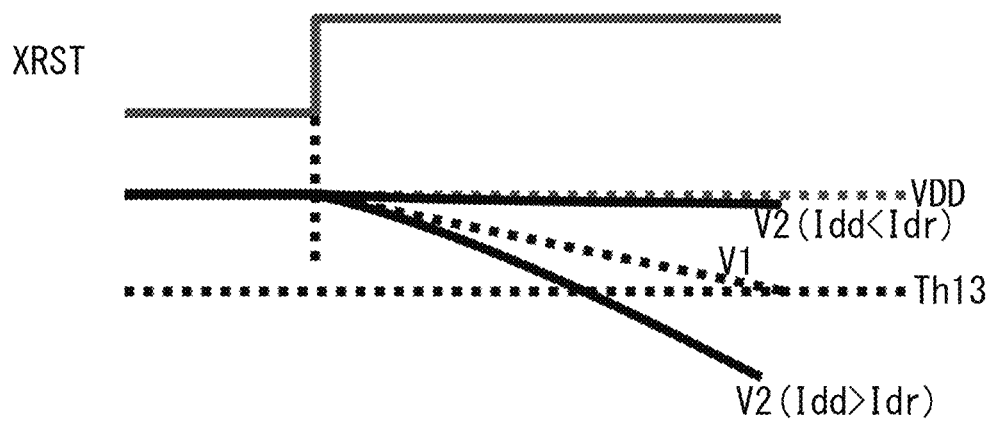
FIG. 4 is a timing chart showing an operation example of a sense amplifier.

Here, FIG. 4 is a timing chart showing examples of waves of the signal XRST, a voltage V1 of the line Ln1, and a voltage V2 of the line Ln2. With reference to FIG. 4 as well, an operation of the sense amplifier 13 will be described. In the read operation, a period of time during which the signal XRST is at low level is referred to as a pre-charge period, and a period of time during which the signal XRST is at high level is referred to as a read period.

In the pre-charge period, during which the signal XRST is at low level, the current I1 (the read current) is off, and the switches S1 and S2 are on. As a result, the gate and the source of each of the PMOS transistors PM1 and PM2 are short-circuited, and the PMOS transistors PM1 and PM2 are off. Further, via the switch S1 that is on, a positive charge is supplied to the line Ln1, and the voltage V1 reaches a level of the power supply voltage VDD. Via the switch S2 that is on, a positive charge is supplied to the line Ln2, and the voltage V2 also reaches the level of the power supply voltage VDD. Note that, at this time, the outputs of the inverters IV1 and IV4 are at low level, and thus the switches S3 and S4 are off.

Then, when the signal XRST is switched from low level to high level for transition from the pre-charge period to the read period, the current I1 is turned on, and the switches S1 and S2 are turned off. As a result, the drain current Idd flows to cause the voltage V2 to drop, and the drain current Idr flows to cause the voltage V1 to drop.

In the read operation performed before execution of the program operation (in the initial state of the memory cell 11), Idd>Idr holds, and thus the voltage V2 drops more quickly than the voltage V1 (see V2 (Idd>Idr) in FIG. 4). When the voltage V2 reaches a threshold value Th13 before the voltage V1 does, the output of the inverter IV4 switches from low level to high level, and the switch S4 is switched on. As a result, the voltage V2=0V is achieved, the PMOS transistor PM2 is on, and the voltage V1=VDD is achieved. At this time, the PMOS transistor PM1 is off. Accordingly, the output signal Sout output from the inverter IV3 is at low level. In short, the output signal Sout is output as a signal that indicates a state where "0" is stored in the memory cell 11.

On the other hand, in the read operation performed after execution of the program operation, since Idd<Idr holds, the voltage V1 drops more quickly than the voltage V2 (see V2 (Idd<Idr)) in FIG. 4). When the voltage V1 reaches the threshold value Th13 before the voltage V2 does, the output of the inverter IV1 switches from low level to high level, and the switch S3 is switched on. As a result, the voltage V1=0 V is achieved, the PMOS transistor PM1 is on, and the voltage V2=VDD is achieved. At this time, the PMOS transistor PM2 is off. Accordingly, the output signal Sout output from the inverter IV3 is at high level. In short, the output signal Sout is output as a signal that indicates a state where "1" is stored in the memory cell 11.

3. Error Correction

As mentioned previously, in the method where, by injecting hot carriers into one of first and second transistors that have the same characteristics in the initial state, "0" or "1" are stored in a memory cell, the value of storage data is indeterminate in the initial state. The memory cell has a tendency to return, over time, to its initial state as a stability point. Thus, the value of the storage data that is originally "0" may change to "1", or the value of the storage data that is originally "1" may change to "0".

Figure 5:
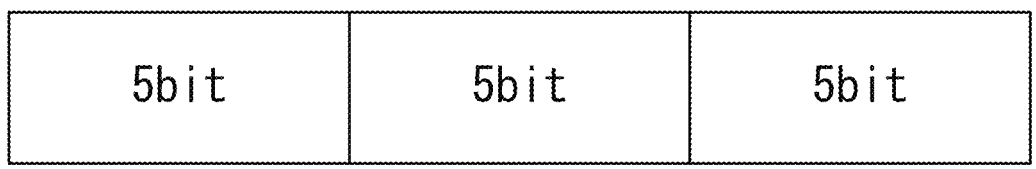
FIG. 5 is a diagram showing a data configuration example for error correction based on a majority voting system (the upper figure), and a data configuration example of a case where ECC (error correction code) is used (the lower figure).
Figure 5:
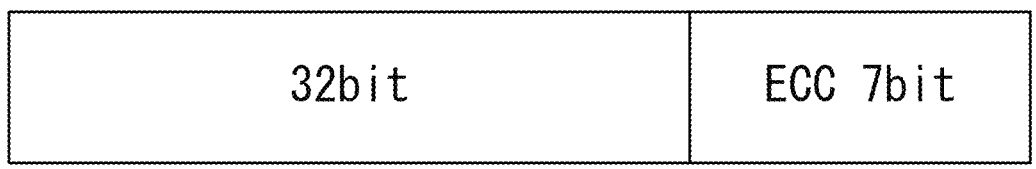

Such errors in data can be corrected, for example, by means of error correction based on a majority voting system. In that case, it is necessary, as exemplified in the upper figure of FIG. 5, to provide an odd number, three or more, of data areas having the same number of bits (five bits in FIG. 5). Then, a majority vote is taken among bits corresponding to each of the odd number of data areas.

Figure 6:
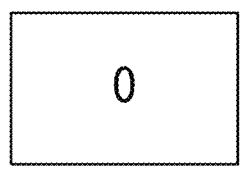
FIG. 6 is a diagram for illustrating error correction based on a majority voting system.
Figure 6:
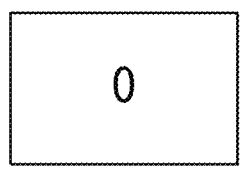
Figure 6:
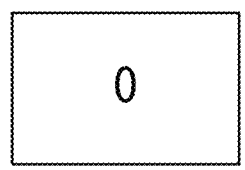
Figure 6:
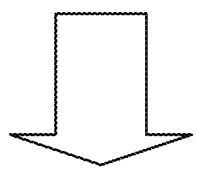
Figure 6:
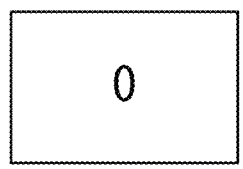
Figure 6:
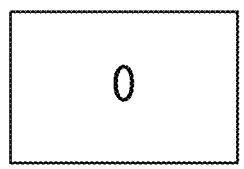
Figure 6:
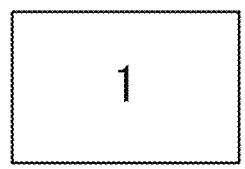
Figure 6:
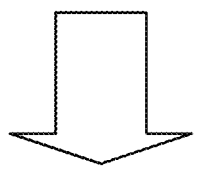

For example, as shown in FIG. 6, in the case of "0" as the original storage data, if the bits each corresponding to one of the odd number (here, three) of data areas are all "0", according to the majority voting rule, "0", which is the majority, is output as data. On the other hand, as shown in FIG. 6, if one of the odd number of bits has changed from "0" to "1", according to the majority voting rule, "0", which is the majority, is output as data.

Figure 7:
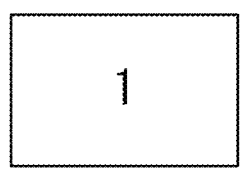
FIG. 7 is a diagram for illustrating error correction based on a majority voting system.
Figure 7:
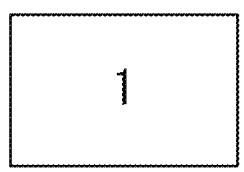
Figure 7:
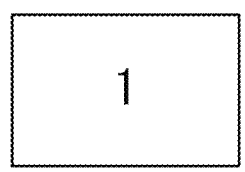
Figure 7:
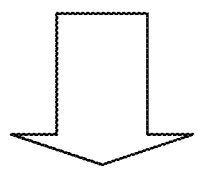
Figure 7:
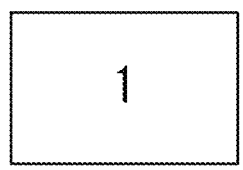
Figure 7:
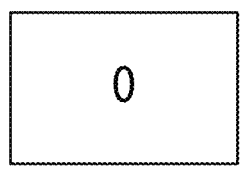
Figure 7:
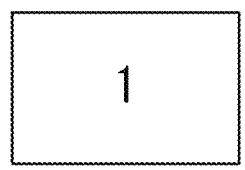
Figure 7:
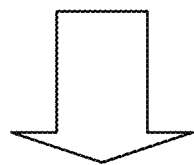

Likewise, as shown in FIG. 7, for example, in the case of "1" as the original storage data, if the bits each corresponding to one of the odd number (here, three) of data areas are all "1", according to the majority voting rule, "1", which is the majority, is output as data. On the other hand, as shown in FIG. 7, if one of the odd number of bits has changed from "1" to "0", according to the majority voting rule, "1", which is the majority, is output as data.

By means of such error correction based on the majority voting system, even in a case where a data error has occurred, it is possible to correct the error. Besides this method, another method is possible where, as exemplified in the lower figure of FIG. 5, an ECC (Error Correction Code) (7 bits in FIG. 5) is added to a data area (32 bits in FIG. 5). However, in a non-volatile memory device of several bits, the majority voting system contributes to a higher circuit area efficiency.

Thus, in the previously-described storage circuit 1 according to the embodiment of the present disclosure, the error correction based on a majority voting system can be adopted. However, in that case, it is necessary to provide at least three same data areas and further a correction circuit for taking a majority vote, which may be disadvantageous in terms of circuit area efficiency. In an embodiment of the present disclosure, to address the above disadvantage, error correction is performed by means of a circuit configuration as described below.

Figure 8:
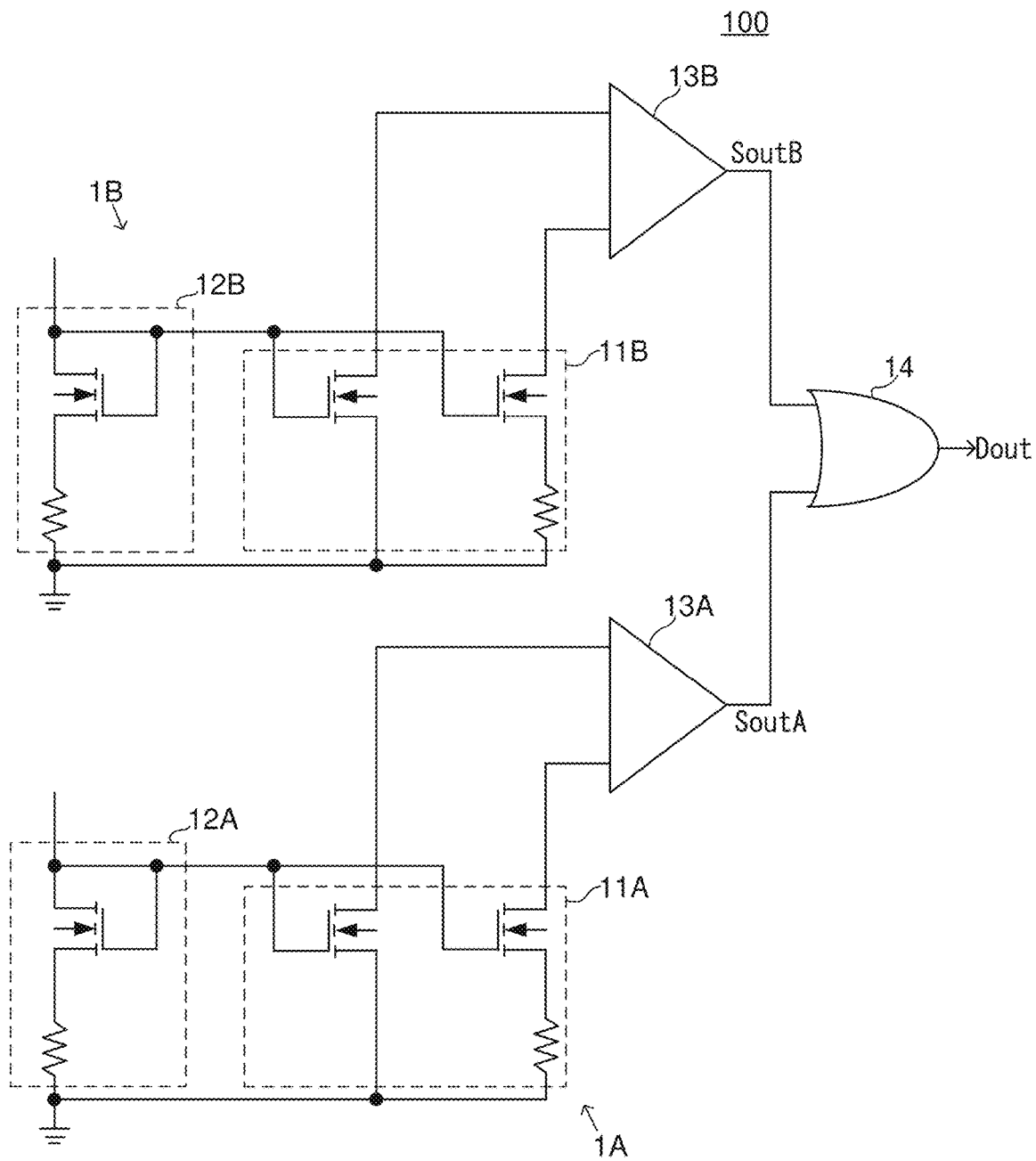
FIG. 8 is a diagram showing a configuration of a non-volatile memory device according to an embodiment of the present disclosure.

FIG. 8 is a diagram showing a configuration of a non-volatile memory device 100 according to an embodiment of the present disclosure. As shown in FIG. 8, the non-volatile memory device 100 includes a storage circuit 1A, a storage circuit 1B, and an OR circuit 14.

The storage circuits 1A and 1B each have a configuration similar to that of the storage circuit 1 (FIG. 1) described above, and respectively include memory cells 11A and 11B, gate voltage generation portions 12A and 12B, and sense amplifier 13A and 13B.

To one input end of the OR circuit 14, an output end of the sense amplifier 13A is connected. To the other input end of the OR circuit 14, an output end of the sense amplifier 13B is connected. That is, output signals SoutA and SoutB respectively output from the sense amplifiers 13A and 13B are input to the OR circuit 14. From the OR circuit 14, a data signal Dout is output.

Before execution of the program operation (in the initial state), the memory cells 11A and 11B are in a state where "0" is stored therein. Then, the memory cells 11A and 11B are rewritten to "1" in a case where the program operation has been executed. Here, in the memory cells 11A and 11B, the same storage data value is stored. Specifically, in a state where "0" is stored in the memory cell 11A, "0" is stored in the memory cell 11B as well, and in a state where "1" is stored in the memory cell 11A, "1" is stored in the memory cell 11B as well.

In these memory cells 11A and 11B, the initial state is the stability point, and there is a possibility of their changing, over time, from the state of "1" after the execution of the program operation to the state of "0", but there is almost no possibility of their changing reversely from "0" to "1". In view of this, in the present embodiment, as an error correction circuit, the OR circuit 14 is provided.

Figure 9:
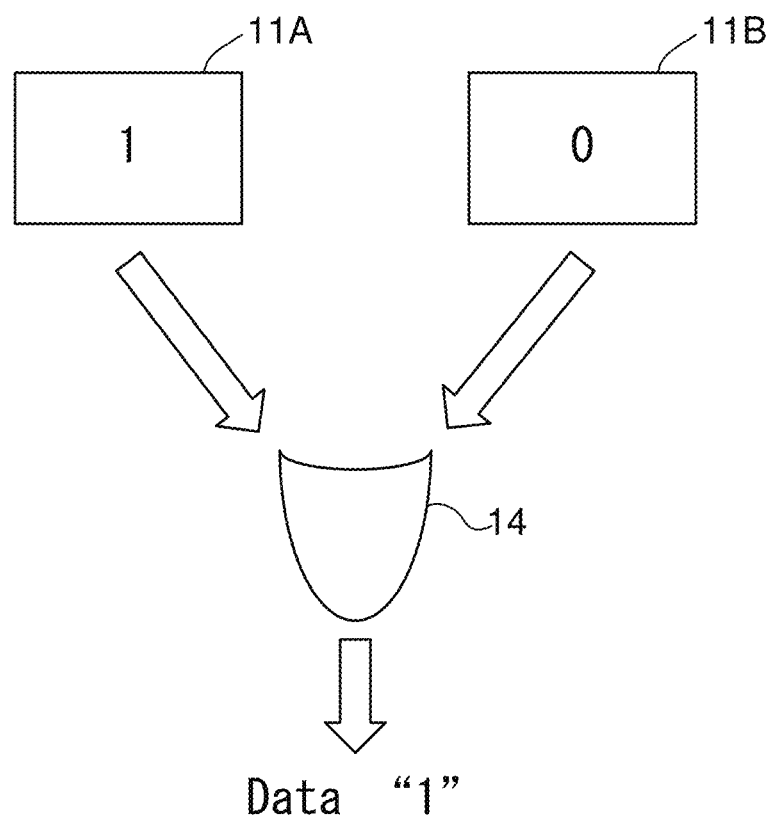
FIG. 9 is a diagram for illustrating error correction according to an embodiment of the present disclosure.

In a case where data originally stored in each of the memory cells 11A and 11B is "1", as shown in FIG. 9, even if the storage data of one of the memory cells 11A and 11B has changed from "1" to "0", the OR circuit 14 outputs the data signal Dout of "1". Thus, the data error can be corrected. Further, in a case where data originally stored in each of the memory cells 11A and 11B is "0", there is almost no possibility of their changing to "1" as described above, and they remain "0" over time, and thus the OR circuit 14 outputs the data signal Dout of "0".

Thus, in the present embodiment, with attention paid to the characteristics of the memory cells 11A and 11B as described above, the OR circuit 14 is used as an error correction circuit. In this manner, it is sufficient to provide two memory cells as one-bit data areas, and furthermore, an OR circuit can be used as an error correction circuit, as a result of which it is possible to improve the circuit area efficiency as compared to the case where the majority voting system is applied as described previously.

Moreover, with the configuration shown in FIG. 8, where the reference elements Mr used in the memory cells 11A and 11B are separate from each other and further the gate voltage generation portions 12A and 12B respectively used corresponding to the memory cells 11A and 11B are also separate from each other, even if a failure occurs in one of the reference elements Mr or in one of the gate voltage generation portions 12A and 12B to prevent one of the sense amplifiers 13A and 13B that corresponds to the failed side from performing correct data reading ("0" is output from one of the sense amplifiers 13A and 13B that corresponds to the failed side), the data signal Dout of the correct data value can be output by the other one of the sense amplifiers 13A and 13B and the OR circuit 14.

4. Modified Example

Figure 10:
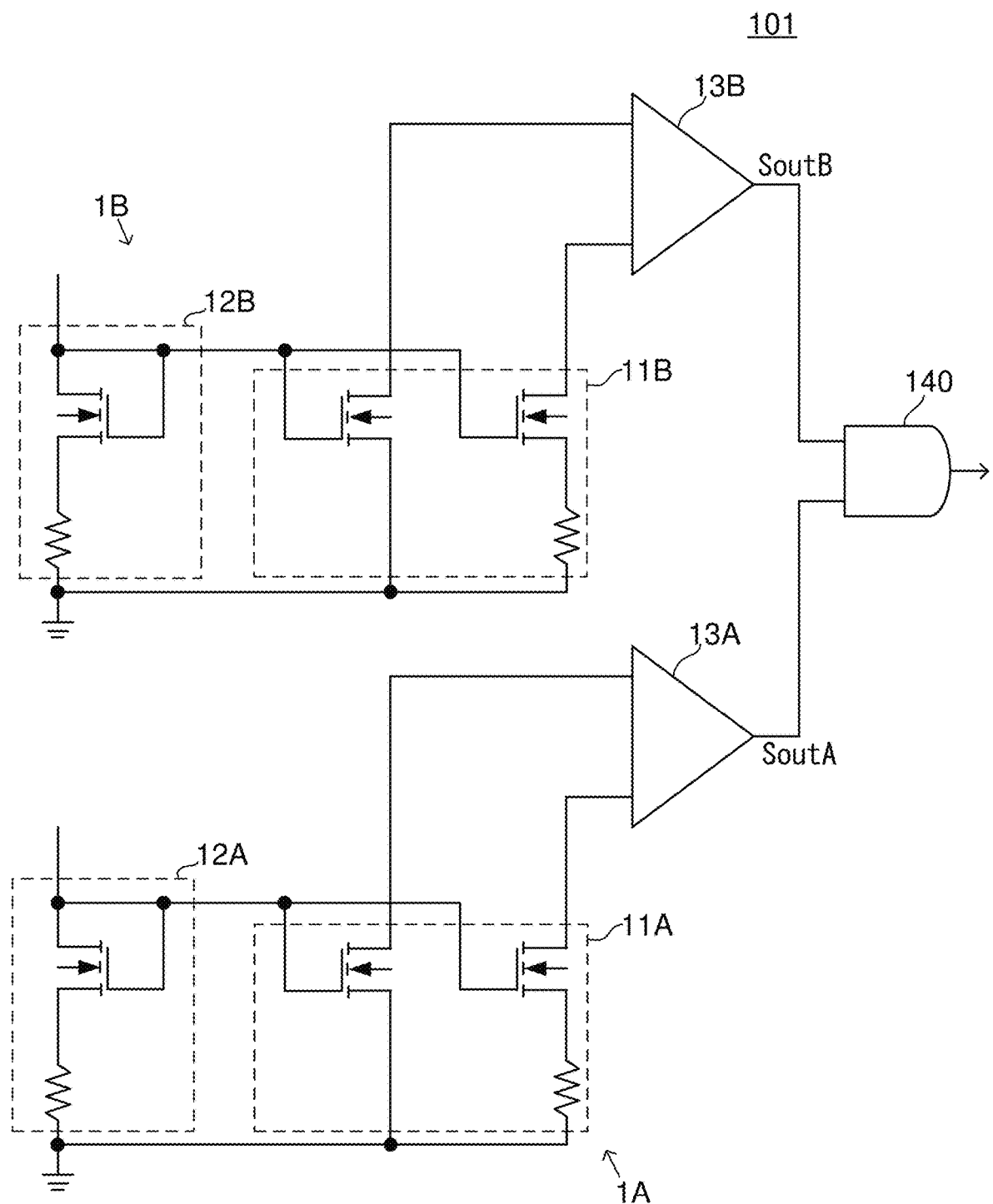
FIG. 10 is a diagram showing a configuration of a non-volatile memory device according to a modified example of the present disclosure.

FIG. 10 is a diagram showing a configuration of a non-volatile memory device 101 according to a modified example of the embodiment shown in FIG. 8. In the non-volatile memory device 101, in the sense amplifiers 13A and 13B, an inverter is added to a subsequent stage of the inverter IV3 in the previously-described configuration shown in FIG. 3, such that the output signal Sout is output from the added inverter.

Accordingly, the memory cells 11A and 11B before execution of the program operation (in the initial state) correspond to a state where data of "1" is stored therein, and by the read operation (Idd>Idr), high-level output signals Sout indicating "1" are output from the sense amplifiers 13A and 13B. On the other hand, the memory cells 11A and 11B after execution of the program operation correspond to a state where data of "0" is stored therein, and by the read operation (Idd<Idr), low-level output signals Sout indicating "0" are output from the sense amplifiers 13A and 13B.

In view of this, in the non-volatile memory device 101 shown in FIG. 10, an AND circuit 140 is provided as an error correction circuit to which the output signals SoutA and SoutB output from the sense amplifiers 13A and 13B are input.

With the initial state as the stability point, there is a possibility of the storage data changing from "0" to "1" over time, but there is almost no possibility of the storage data changing from "1" to "0". In a case where "0" is stored in the memory cells 11A and 11B as original storage data, even if the storage data of one of the memory cells 11A and 11B changes from "0" to "1", the data signal Dout of "0" is output from the AND circuit 140, and the data error can be corrected. On the other hand, in a case where "1" is stored in the memory cells 11A and 11B as original storage data, there is almost no possibility of the storage data changing from "1" to "0" over time, and the storage data remains "1", and thus the data signal Dout of "1" is output from the AND circuit 140.

With the above configuration as well, it is possible to achieve effects similar to those achieved with the previously-described embodiment.

5. Multiple-Bit Data Area

Figure 11:
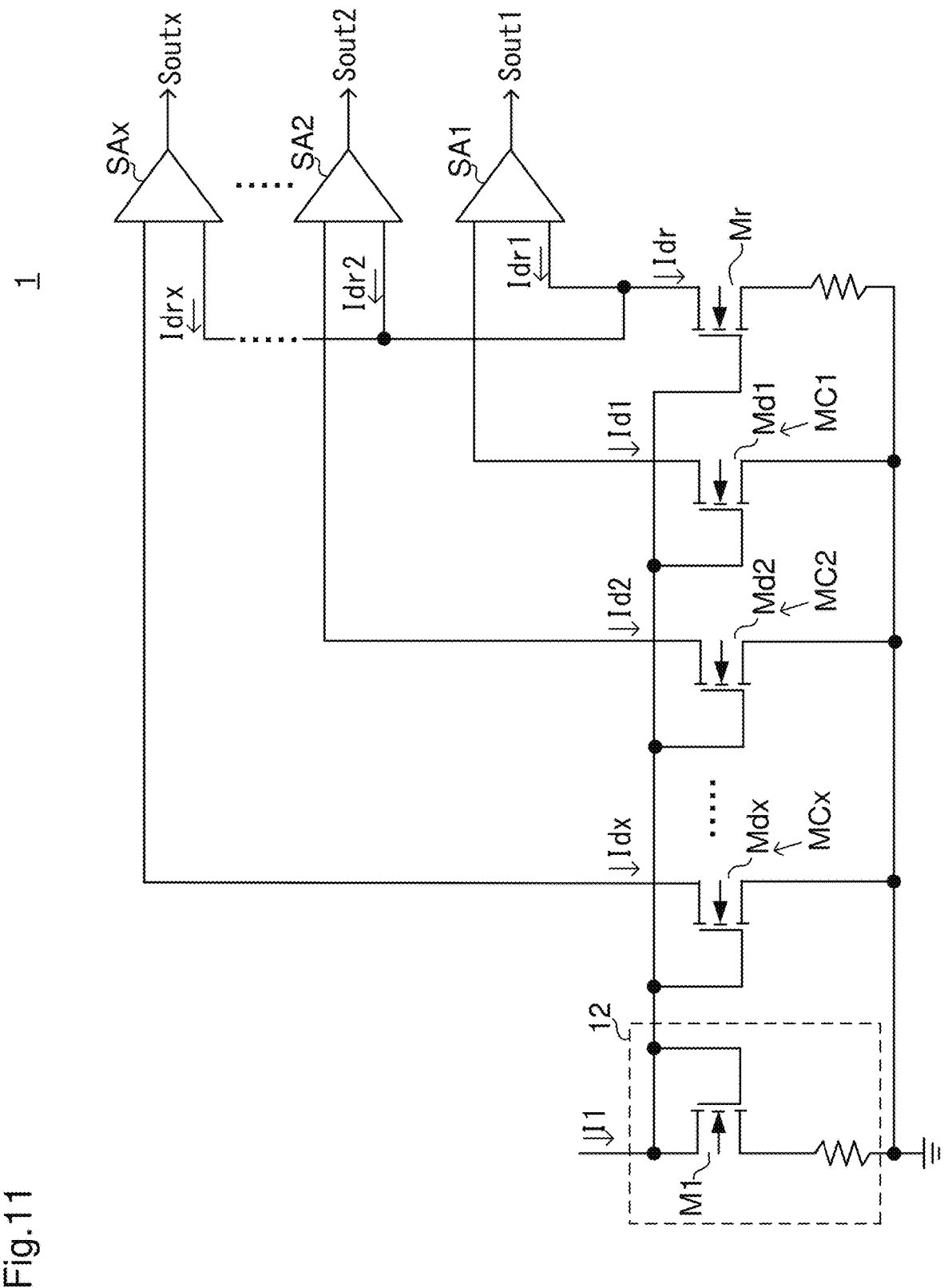
FIG. 11 is a diagram showing a configuration example of a storage circuit having a multiple-bit data area.

FIG. 11 is a diagram showing a configuration of a storage circuit 1 having a multiple-bit data area. The storage circuit 1 shown in FIG. 11 has, as a multiple-bit data area, a plurality of memory cells MC1 to MCx (x=m, m representing the number of bits (m>1)).

As shown in FIG. 11, to a line to which the gate of the transistor M1 in the gate voltage generation portion 12 and the gate of the reference element Mr are commonly connected, gates of data elements Md1 to Mdx are commonly connected. The memory cells MC1 to MCx include the reference element Mr, and respectively include the data elements Md1 to Mdx. That is, the reference element Mr is common to the memory cells MC1 to MCx. The commonization of the reference element Mr contributes to a reduced circuit area.

The storage circuit 1 shown in FIG. 11 includes sense amplifiers SA1 to SAx corresponding to the memory cells MC1 to MCx. The drain of the reference element Mr is commonly connected to one input end of each of the sense amplifiers SA1 to SAx. A drain of each of the data elements Md1 to Mdx is connected to the other input end of a corresponding one of the sense amplifiers SA1 to SAx.

With the data elements Md1 to Mdx each taking the initial state or the state of after execution of the program operation, data of "0" or "1" is stored in each of the memory cells MC1 to MCx. In the read operation, during which the current I1 (the read current) is supplied, based on respective magnitude relationships between drain currents Idr1 to Idrx, which are each a division of the drain current Idr flowing in the reference element Mr, and drain currents Id1 to Idx flowing in the data elements Md1 to Mdx, the sense amplifiers SA1 to SAx output output signals Sout1 to Soutx. In this manner, in the storage circuit 1, m-bit data is read oud by the sense amplifiers SA1 to SAx.

Figure 12:
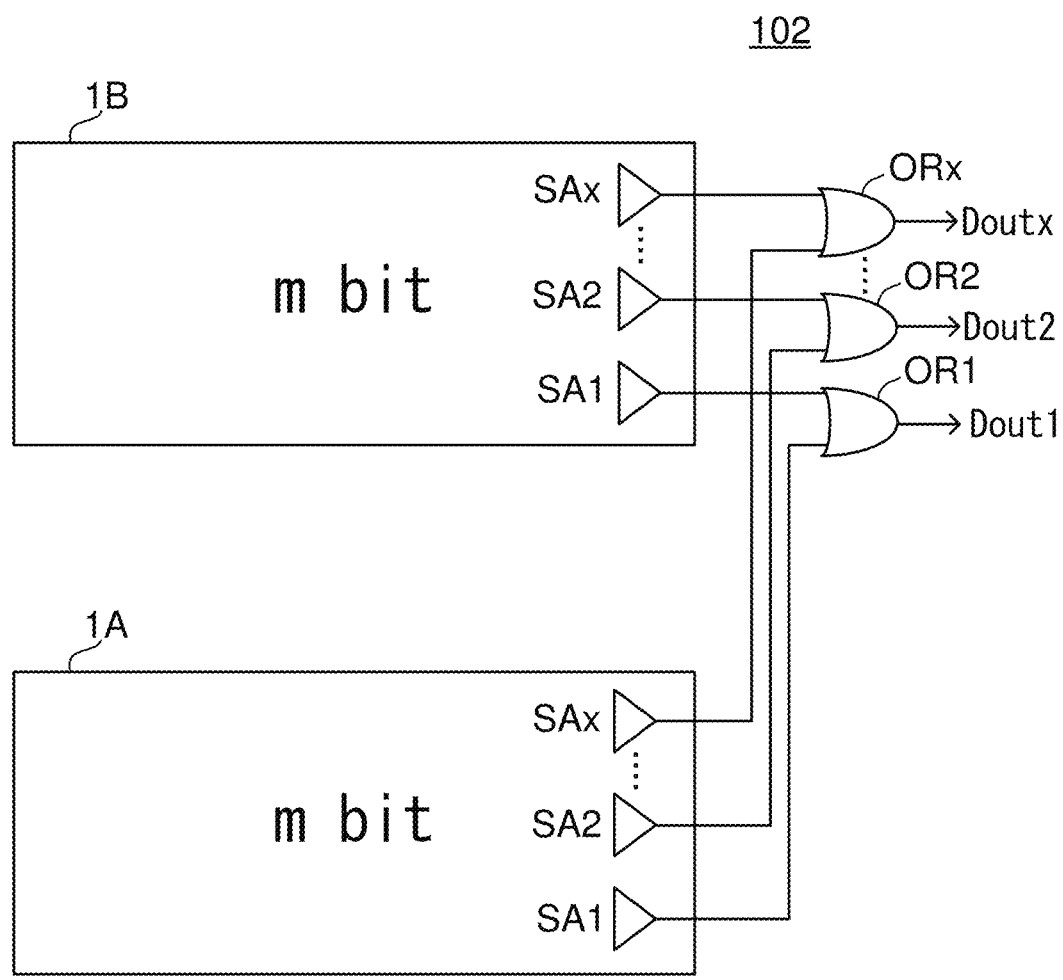
FIG. 12 is a diagram showing a configuration of a non-volatile memory device using the storage circuit shown in FIG. 11.

FIG. 12 shows a non-volatile memory device 102 having a configuration where an error correction circuit is applied to the storage circuit 1 shown in FIG. 11. The non-volatile memory device 102 includes storage circuits 1A and 1B each having a configuration similar to the configuration shown in FIG. 11, and OR circuits OR1 to ORx as the error correction circuit. In corresponding ones of the memory cells MC1 to MCx of the storage circuits 1A and 1B, data of the same value is stored.

To one input end of each of the OR circuits OR1 to ORx, an output end of a corresponding one of the sense amplifiers SA1 to SAx in the storage circuit 1A is connected, and to the other input end of each the OR circuits OR1 to ORx, an output end of a corresponding one of the sense amplifiers SA1 to SAx in the storage circuit 1B is connected. From the OR circuits OR1 to ORx, the data signals Dout1 to Doutx are output.

With this configuration of the non-volatile memory device 102, it is possible to perform error correction with respect to each of the m-bit data while improving the circuit area efficiency. In particular, in each of the storage circuits 1A and 1B, where one of the sense amplifiers SA1 to SAx is provided per bit, effect of reduction of the number of sense amplifiers is significant.

Furthermore, separate reference elements Mr and separate gate voltage generation portions 12 are used in the storage circuits 1A and 1B, and thus, even in a case where a trouble has occurred in the reference element Mr or the gate voltage generation portion 12 of one of the storage circuits 1A and 1B, correct data can be read out by means of the data signals Dout1 to Doutx.

Here, similarly to the previously-described modified example, the OR circuits OR1 to ORx may each be replaced with an AND circuit.

Figure 13:
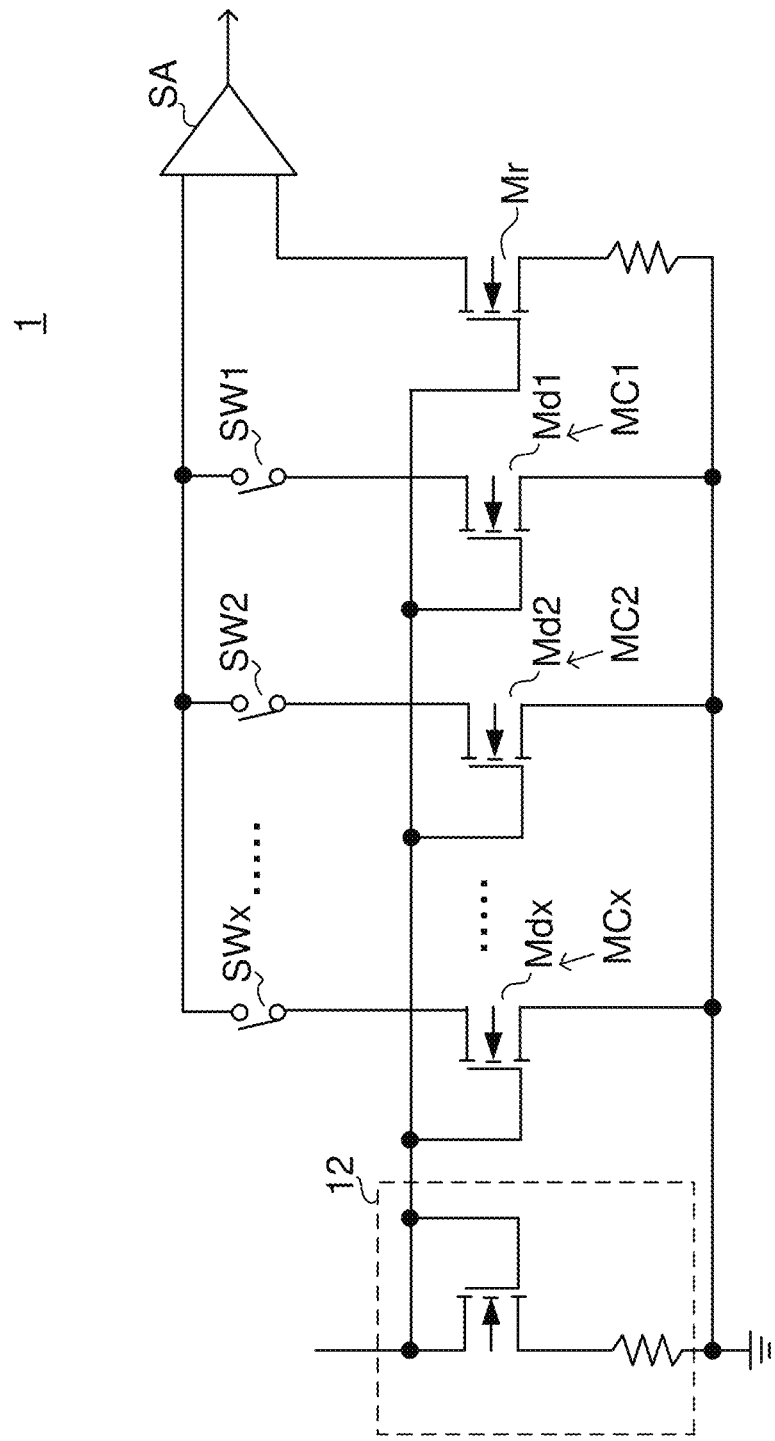
FIG. 13 is a diagram showing a modified example of the storage circuit having a multiple-bit data area.

FIG. 13 is a diagram showing a modified example of the storage circuit 1 having a multiple-bit data area. A storage circuit 1 shown in FIG. 13 is different from the previously-described configuration shown in FIG. 11 in that it has one sense amplifier SA having one input end to which the drain of the reference element Mr is connected, and that between the other input end of the sense amplifier SA and each of drains of the data elements Md1 to Mdx, a corresponding one of switches SW1 to SWx is disposed.

In a case of selecting from among the memory cells MC1 to MCx, such one of the switches SW1 to SWx as corresponds to a selected one of the memory cells MC1 to MCx is turned on and the other ones of the switches SW1 to SWx are off. It is possible, while sequentially selecting one of the memory cells MC1 to MCx switchingly by means of the switches SW1 to SWx, to read out data of the memory cells MC1 to MCx by means of the sense amplifier SA. In this manner, it is possible to read out m-bit data by means of the single sense amplifier SA, and this is advantageous in terms of circuit area.

Here, in a case of configuring a non-volatile memory device by applying an error correction circuit to the storage circuit 1 shown in FIG. 13, the storage circuit 1 may include two storage circuits 1, and an OR circuit or an AND circuit may be provided as an error correction circuit to which an output of the sense amplifier SA of each of the two storage circuits 1 is input. In this manner, a data error in a multiple-bit data area can be corrected by means of one error correction circuit.

6. Others

Other than the embodiments described above, various technical features disclosed in this description can be variously modified within the scope without deviating from the spirit of the technical invention. That is, it should be considered that the above embodiments are illustrative in all respects and are not limiting, and it should be understood that the technological scope of the present invention is not limited to the above description of the embodiments, and that all modifications within the scope of the claims and the meaning equivalent to the claims are covered.

For example, in the memory cell 11 (FIG. 1), without providing the reference resistor Rr, the size of the data element Md may be increased to be larger than that of the reference element Mr to thereby achieve the magnitude relationship of Idd>Idr between the drain currents in the initial state.

Further, the memory cell 11, which is composed of an NMOS transistor, may instead be composed of a PMOS transistor, for example.

7. Supplementary Notes

As described above, according to the present disclosure, a non-volatile memory device (100) includes a memory cell (11A, 11B) that is, in an initial state, in a state of having storage data of a first logical value stored therein, and that is, after execution of a program operation, in a state of having storage data of a second logical value stored therein, and an error correction circuit (14) that corrects only an error caused by a change in logical value of storage data stored in the memory cell from the second logical value to the first logical value (a first configuration).

Further, in the above first configuration, the memory cell (11A, 11B) may include two memory cells, the non-volatile memory device may further include a read-out portion (13A, 13B) that is provided for each of the two memory cells and that is configured to read out storage data from the memory cell, and an output from the read-out portion may be input to the error correction circuit (14) (a second configuration).

Further, in the above second configuration, the first logical value may be "0", the second logical value may be "1", and the error correction circuit may be an OR circuit (14) (a third configuration).

Further, in the above second configuration, the first logical value may be "1", the second logical value may be "0", and the error correction circuit may be an AND circuit (140) (a fourth configuration).

Further, in any one of the above second to fourth configurations, the memory cell (11A, 11B) may include a data element (Md) as an execution target of the program operation and a reference element (Mr), and the read-out portion (13A, 13B) may read out storage data based on a magnitude relationship between a current flowing in the data element and a current flowing in the reference element (a fifth configuration).

Further, in the above fifth configuration, gates of the data element (Md) and the reference element (Mr) may be connected to each other, and the memory cell may include a reference resistor (Rr) connected to the reference element (a sixth configuration).

Further, in the above fifth or sixth configuration, the reference element (Mr) may be provided separately in each of the two memory cells (11A, 11B) (a seventh configuration).

Further, in any one of the above fifth to seventh configurations, gates of the data element (Md) and the reference element (Mr) may be connected to each other, the non-volatile memory device may further include a gate voltage generation portion (12A, 12B) that generates a gate voltage to be applied to the gates, and the gate voltage generation portion may be provided separately for each of the two memory cells (11A, 11B) (an eighth configuration).

Further, in any one of the above second to eighth configurations, the non-volatile memory device may further include two storage circuits (1A, 1B) that each include a multiple-bit data area including a plurality of the memory cells (MC1 to MCx) and the read-out portion (SA1 to SAx) provided for each bit, the error correction circuit may include a plurality of error correction circuits (OR1 to ORx), and an output from the read-out portion in each of the two storage circuits may be input to a corresponding one of the error correction circuits (a ninth configuration).

Further, in the above ninth configuration, the memory cell (MC1 to MCx) may include a data element (Md1 to Mdx) as an execution target of the program operation, and a reference element (Mr), and, in each of the storage circuits, the reference element may be common to the plurality of the memory cells (a tenth configuration).

Further, in one of the above second to eighth configurations, the non-volatile memory device may further include two storage circuits (1) each including a plurality of memory cells (MC1 to MCx) that each include a data element (Md1 to Mdx) as an execution target of the program operation and a common reference element (Mr), the single read-out portion (SA), and a switching portion (SW1 to SWx) that switches connection between the data element and the read-out portion, and an output from the read-out portion in each of the two storage circuits may be input to the error correction circuit (an eleventh configuration).

INDUSTRIAL APPLICABILITY

The present disclosure can be used in, for example, non-volatile memory devices mounted in various semiconductor devices.

REFERENCE SIGNS LIST 1 storage circuit
1A, 1B storage circuit
11 memory cell
11A, 11B memory cell
12 gate voltage generation portion
12A, 12B gate voltage generation portion
13 sense amplifier
13A, 13B sense amplifier
PM1, PM2 PMOS transistor
S1, S2 switch
S3, S4 switch
IV1 to IV4 inverter
14 OR circuit
20 program circuit
30 control circuit
100 non-volatile memory device
101 non-volatile memory device
102 non-volatile memory device
140 AND circuit
Ln1 line
Ln2 line
M1 NMOS transistor
MC1 to MCx memory cell
Md data element
Md1 to Mdx data element
Mr reference element
OR1 to ORx OR circuit
R1 resistor
Rr reference resistor
SA sense amplifier
SA1 to SAx sense amplifier
SW1 to SWx switch

The invention claimed is:

1. A non-volatile memory device, comprising:
a memory cell that is, in an initial state, in a state of having storage data of a first logical value stored therein, and that is, after execution of a program operation, in a state of having storage data of a second logical value stored therein; and
an error correction circuit configured to correct only an error caused by a change in logical value of storage data stored in the memory cell from the second logical value to the first logical value,
wherein the memory cell includes two memory cells, the non-volatile memory device further comprises a read-out portion that is provided for each of the two memory cells and that is configured to read out storage data from the memory cell, and an output from the read-out portion is input to the error correction circuit,
wherein the memory cell is configured to include a data element as an execution target of the program operation, and a reference element, and the read-out portion is configured to read out storage data based on a magnitude relationship between a current flowing in the data element and a current flowing in the reference element, and
wherein gates of the data element and the reference element are connected to each other, the non-volatile memory device further comprises a gate voltage generation portion configured to generate a gate voltage to be applied to the gates, and the gate voltage generation portion is provided separately for each of the two memory cells.

2. The non-volatile memory device of claim 1, wherein the first logical value is "0" and the second logical value is "1", and the error correction circuit is an OR circuit.

3. The non-volatile memory device of claim 1, wherein the first logical value is "1" and the second logical value is "0", and the error correction circuit is an AND circuit.

4. The non-volatile memory device of claim 1, wherein gates of the data element and the reference element are connected to each other, and the memory cell comprises a reference resistor connected to the reference element.

5. The non-volatile memory device of claim 1, further comprising two storage circuits that each comprise a multiple-bit data area including a plurality of the memory cells and the read-out portion provided for each bit,
wherein the error correction circuit includes a plurality of error correction circuits, and an output from the read-out portion in each of the two storage circuits is input to a corresponding one of the error correction circuits.

6. The non-volatile memory device of claim 5, wherein the memory cell comprises a data element as an execution target of the program operation, and a reference element, and in each of the storage circuits, the reference element is common to the plurality of the memory cells.

7. The non-volatile memory device of claim 1, further comprising two storage circuits each comprising a plurality of memory cells each including a data element as an execution target of the program operation and a common reference element, the read-out portion, and a switching portion configured to switch connection between the data element and the read-out portion, wherein an output from the read-out portion in each of the two storage circuits is input to the error correction circuit.

* * * * *